United States Patent
Brown et al.

(10) Patent No.: US 10,142,919 B2
(45) Date of Patent: Nov. 27, 2018

(54) CELLULAR MOBILE DEVICE

(71) Applicant: British Telecommunications Public Limited Company, London (GB)

(72) Inventors: Ruth Brown, London (GB); Richard Mackenzie, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/561,299

(22) PCT Filed: Mar. 23, 2016

(86) PCT No.: PCT/EP2016/056441
§ 371 (c)(1),
(2) Date: Sep. 25, 2017

(87) PCT Pub. No.: WO2016/151041
PCT Pub. Date: Sep. 29, 2016

(65) Prior Publication Data
US 2018/0103416 A1   Apr. 12, 2018

(30) Foreign Application Priority Data
Mar. 25, 2015   (EP) ..................................... 15275085

(51) Int. Cl.
*H04W 48/10* (2009.01)
*H04L 29/12* (2006.01)
(Continued)

(52) U.S. Cl.
CPC ......... *H04W 48/10* (2013.01); *H04L 61/3075* (2013.01); *H04W 16/32* (2013.01);
(Continued)

(58) Field of Classification Search
CPC ..... H04W 48/10; H04W 48/20; H04W 8/183; H04W 84/045; H04L 61/3075
(Continued)

(56) References Cited

U.S. PATENT DOCUMENTS 5,613,213 A * 3/1997 Naddell .................. H04W 4/00
455/154.2
9,713,059 B2   7/2017 Ramirez et al.
(Continued)

FOREIGN PATENT DOCUMENTS

EP   2048891 A1 *  4/2009  ............. H04L 41/12
EP   2355587 A1    8/2011
(Continued)

OTHER PUBLICATIONS

3GPP TS.04.08 V7.21.0 (Dec. 2003) Technical Specification; 3rd Generation Partnership Project; Technical Specification Group Core Network; Mobile Radio Interface Later 3 Specification; (Release 1998) Version 7; 650 Route des Lucioles—Sophia Antipolis Valbonne—France; http://www.3gpp.org; pp. 623.
(Continued)

*Primary Examiner* — Marisol Figueroa
(74) *Attorney, Agent, or Firm* — Amy M. Salmela; Patterson Thuente Pedersen, P.A.

(57) ABSTRACT

In a cellular communications network having a radio access network of macrocells and small cells, a mobile device having a UICC/SIM card is configured to change its displayed network name and functionality in accordance with whether the mobile device has connected to a macrocell or a small cell. The displayed network name information is modified to inform the user about new services or data usage restrictions.

15 Claims, 6 Drawing Sheets

(51) Int. Cl.
  *H04W 48/20* (2009.01)
  *H04W 8/18* (2009.01)
  *H04W 84/04* (2009.01)
  *H04W 16/32* (2009.01)

(52) U.S. Cl.
  CPC ............ *H04W 48/20* (2013.01); *H04W 8/183* (2013.01); *H04W 84/045* (2013.01)

(58) Field of Classification Search
  USPC ........................................ 455/436–444, 434
  See application file for complete search history.

(56) References Cited

U.S. PATENT DOCUMENTS

| | | | |
|---|---|---|---|
| 2002/0123340 | A1 | 9/2002 | Park |
| 2006/0160537 | A1* | 7/2006 | Buckley ................ H04W 48/18 455/435.2 |
| 2008/0242297 | A1 | 10/2008 | Lee et al. |
| 2010/0165867 | A1 | 7/2010 | Nylander et al. |
| 2010/0216439 | A1 | 8/2010 | Marcelli et al. |
| 2012/0047269 | A1* | 2/2012 | Leonov ................ H04W 4/021 709/227 |
| 2012/0315956 | A1 | 12/2012 | Mochida et al. |

FOREIGN PATENT DOCUMENTS

| | | |
|---|---|---|
| EP | 2005727 B1 | 11/2012 |
| GB | 2456531 A | 7/2009 |

OTHER PUBLICATIONS

3GPP TS 25.331 V12.2.0 (Jun. 2014) Technical Specification; 3rd Generation Partnership Project; Technical Specification Group Radio Access Network; Radio Resource Control (RRC); Protocol specification (Release 12) Version 12; 650 Route des Lucioles—Sophia Antipolis Valbonne—France; http://www.3gpp.org; pp. 2,140.

3GPP TS 36.304 V12.1.0 (Jun. 2014) Technical Specification; 3rd Generation Partnership Project; Technical Specification Group Radio Access Network; Evolved Universal Terrestrial Radio Access (E-UTRA); User Equipment (UE) procedures in idle mode (Release 12); 650 Route des Lucioles Sophia Antipolis Valbonne—France; http://www.3gpp.org; pp. 35.

3GPP TS 31.102 V12.4.0 (Jul. 2014) Technical Specification; 3rd Generation Partnership Project; Technical Specification Group Core Network Terminals; Characteristics of the Universal Subscriber Identity Module (USIM) application (Release 12); 650 Route des Lucioles—Sophia Antipolis Valbonne—France; http://www.3gpp.org; pp. 231.

3GPP TS 24.008 V12.6.0 (Jun. 2014) Technical Specification; 3rd Generation Partnership Project; Technical Specification Group Core Network Terminals; Mobile radio interface Layer 3 specification; Core network protocols; Stage 3; (Release 12); 650 Route des Lucioles—Sophia Antipolis Valbonne—France; http://www.3gpp.org; pp. 698.

3GPP TS 23.12 V12.5.0 (Jun. 2014) Technical Specification; 3rd Generation Partnership Project; Technical Specification Group Core Network Terminals; Non-Access Stratum (NAS) functions related to Mobile Station (MS) in idle mode; (Release 12); 650 Route des Lucioles—Sophia Antipolis Valbonne—France; http://www.3gpp.org; pp. 46.

3GPP TS 24.301 V12.5.0 (Jun. 2014) Technical Specification; 3rd Generation Partnership Project; Technical Specification Group Core Network Terminals; Non-Access Stratum (NAS) protocol for Evolved Packet System (EPS); Stage 3; (Release 12); 650 Route des Lucioles—Sophia Antipolis Valbonne—France; http://www.3gpp.org; pp. 367.

Application and Filing Receipt for U.S. Appl. No. 15/101,776, filed Jun. 3, 2016, Inventors: Ramirez et al.

* cited by examiner

CELLULAR MOBILE DEVICE

CROSS-REFERENCE TO RELATED APPLICATIONS

The present application is a National Phase entry of PCT Application No. PCT/EP2016/056441, filed on 23 Mar. 2016, which claims priority to EP Patent Application No. 15275085.7, filed on 25 Mar. 2015, which are hereby fully incorporated herein by reference.

TECHNICAL FIELD

The present disclosure relates to cellular telecommunications and in particular to a method and apparatus for network naming.

BACKGROUND

Cellular networks known as Public Land Mobile Networks (PLMNs) provide voice and data connectivity to mobile devices across a large geographical area, typically a country. Each cellular network is operated by a mobile network operator (MNO) and is formed of a mobile network core, in LTE networks known as an Enhanced Packet Core (EPC), with a number of macrocell radio stations, known in LTE as Enhanced NodeBs (eNodeBs), located at the edges of the network.

In the UK there are several mobile network operators (MNOs), each owning and operating a separate band of licensed spectrum to carry the network signals. In addition to MNOs, there are Mobile Virtual Network Operators (MVNOs) which use one or more of the MNO physical networks to offer mobile service to users at a different cost.

In each case of MNO and MVNO, the identity of the mobile network is broadcast by the macrocells in the form of a Mobile Country Code (MCC) and Mobile Network Code (MNC) pair which provides a globally unique identity for each mobile network.

Each handset can only connect to a single PLMN at a time. Each subscriber of a cellular network has a Universal Integrated Circuit Card (UICCs), commonly, but incorrectly, referred to as Subscriber Identity Module (SIM) cards which have been issued by the MNO or MVNO containing, among other things, the authentication credentials for accessing the respective network. Furthermore, each UICC includes a central processor and application code to run a Universal Subscriber Identity Module (USIM) application for controlling access to Universal Mobile Telephone System (UMTS) and Long Term Evolution (LTE) cellular networks.

When a mobile device is switched on and the mobile device scans for surrounding base stations and presents the list of detected base stations to the USIM. The USIM determines which base stations are owned by the appropriate MNO, MVNO, and provides information to the handset to allow it to authenticate and connect to the macrocell of the appropriate MNO network.

As part of the connection process, the USIM is responsible for determining a network name to be displayed to the subscriber so that they know which network they are connected to. This is especially important in the case of international roaming where the MNO has no local presence and relies on a commercial agreement with a foreign network to provide connectivity at increased cost.

When connected to the PLMN, the handset will display the same MNO network name when it is connected to any of the MNO's macrocells. The macrocells all have the same configuration and therefore are capable of offering the same services.

Whilst macrocells provide wide area geographical network coverage, they are large devices and therefore are costly to install. Furthermore they require a high capacity backhaul network link to the EPC. Recently, short range cellular base station devices known as small cells (the term covers femtocells and picocells) are being deployed by MNOs in order to extend and supplement the coverage of the macrocells and to provide additional network capacity in densely populated areas. The small cells provide cellular coverage over a range of up to 200 m and use a consumer broadband connection to backhaul data to the MNO core.

Small cells are beneficial to the MNOs are they can easily provide additional coverage in certain geographical areas while also reducing strain on the existing macrocells because the traffic is backhauled without requiring further investment by the MNO.

Generally, the quality of experience for a subscriber is also improved because they have a more reliable cellular signal, especially in densely populated areas or areas where the macrocell signal is poor. The handover and idle mode reselection mechanisms from the macrocells and small cells, small cells to macrocells and small cells to small cells is also no different to typical macrocell to macrocell migration. Therefore the presence of small cells in the network is transparent to a subscriber. The entire radio access network (RAN) of the PLMN is presented as a single network.

A problem with the transparent setup in the RAN is that although macrocell eNodeBs and small cells have very different hardware and service capabilities, they are presented as being homogenous access points into the PLMN and therefore the mobile device and subscriber are not made aware of any services that a particular type of base station device is able to provide.

SUMMARY

In one aspect, an embodiment of the present disclosure provides a method of operating a mobile device within a cellular network formed of a network core and a plurality of base stations, the method comprising: scanning for a set of base stations from the plurality of base stations; selecting a base station from the set of base stations for connection; displaying the network name associated with the cellular network; determining the type of the selected base station; and displaying a network name associated with the type of the selected base station.

In another aspect, an embodiment of the present disclosure provides a mobile device apparatus within a cellular network formed of a network core and a plurality of base stations, the mobile device apparatus comprising: scanning means for scanning for a set of base stations from the plurality of base stations; selecting means for selecting a base station from the set of base stations for connection; and display means for displaying the network name associated with the cellular network associated with the selected base station; and means for determining the type of the selected base station, wherein the display means is configured to display a network name associated with the type of the selected base station.

In a further aspect, and embodiment of the present disclosure provides a computer program element comprising computer program code to, when loaded into a computer system and executed thereon, cause the computer to perform the method set out above.

BRIEF DESCRIPTION OF THE DRAWINGS

An embodiment of the present disclosure will now be described, by way of example only, with reference to the accompanying drawings, in which.

DETAILED DESCRIPTION

Figure 1:
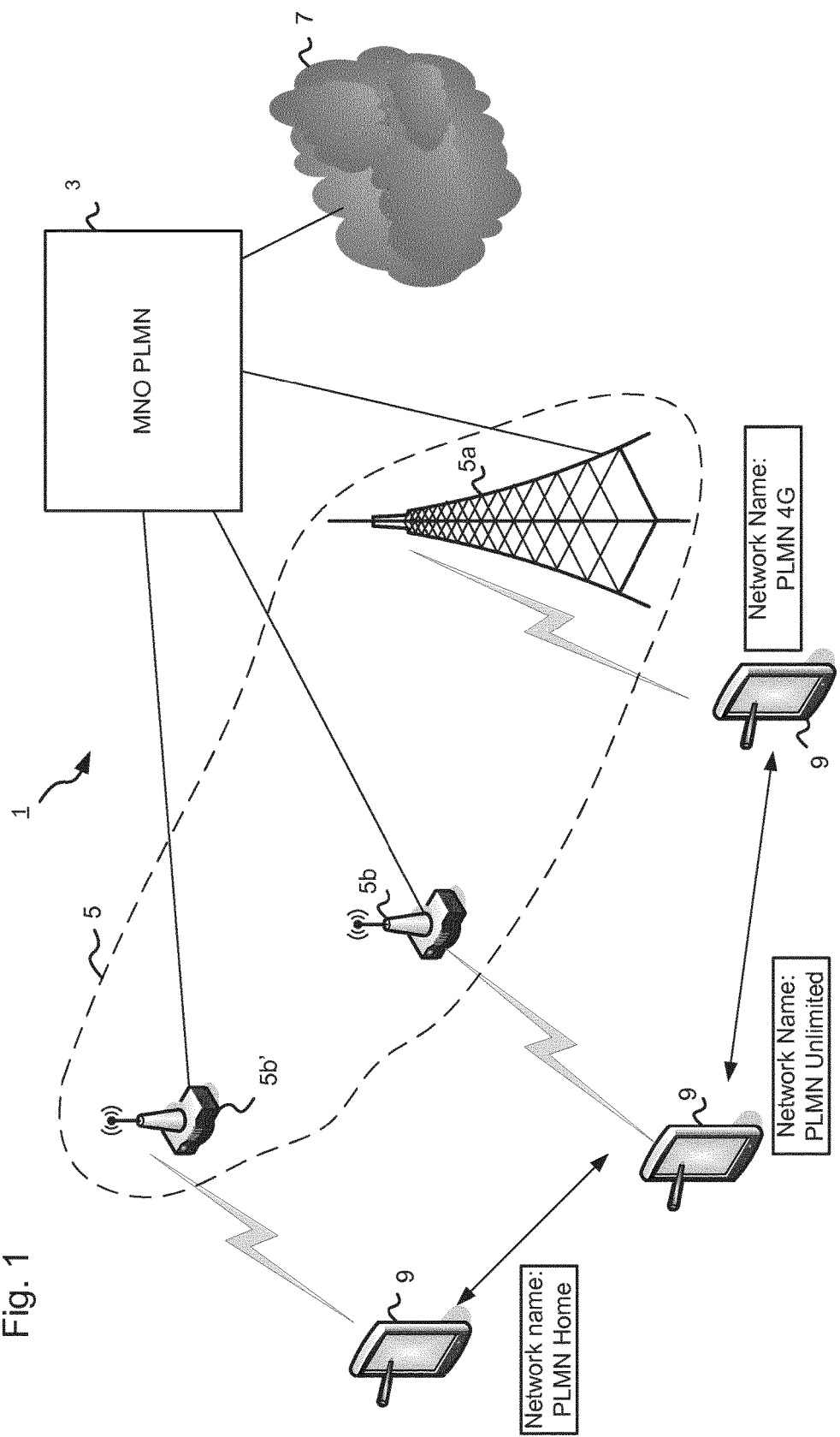
FIG. 1 is an overview of a cellular network where a mobile device connected the cellular network operates in accordance with a first embodiment.

FIG. 1 shows a basic view of a cellular network 1 belonging to a MNO. The MNO's PLMN core 3 is connected to a radio access network 5 and wide area networks such as the Internet 7 and provides routing for data packets between a mobile device 9 connected to the RAN 5 and correspondent node resources on the Internet 7. The PLMN core 3 also controls functions such as subscriber authentication, configuration, billing, etc.

The RAN 5 is formed of a number of different types of base stations and configured to provide 2G Global System for Mobile Communications (GSM), 3G Universal Mobile Telecommunications System (UMTS) and 4G Long Term Evolution (LTE) mobile data connectivity. For example, the RAN operates in the 800 Mhz and 1800 Mhz frequency bands for GSM, and 2100 Mhz frequency band for UMTS and LTE. In addition to the usual wide area macrocells 5a, the RAN 5 includes a number of small cells 5b, the term covering shorter range devices such as picocells and femtocells. The term base station will be used to refer to macrocells 5a and small cells 5b collectively.

The mobile device 9, e.g. a mobile phone, tablet with cellular connectivity or computer with cellular connectivity, connects to the cellular network 1 using cellular wireless protocol signals such as Long Term Evolution (LTE) to communicate with one of the base stations 5. The decision to connect to a macrocell 5a or small cell 5b is generally determined by reception signal strength, i.e. the mobile device 9 will measure the signal strength to each detected base station in the RAN 5 and select the base station 5a, 5b, having the strongest signal. Due to the differences in transmission power and range, the mobile device 9 must be physically closer to a small cell 5b in order to select the small cell 5b in preference to a macrocell 5a.

Conventionally, each base station within the RAN 5 is configured to broadcast the same network information to subscriber mobile devices 9. The information takes the form of information sent in Master Information Block (MIB) messages and dynamic information in System Information Block (SIB) messages which are defined in standard 3GPP TS25.331 which is incorporated by reference to this document. One of the main information fields is a PLMN list which contains up to six PLMN identities for that base station. This is to allow for an MNO to have support multiple spectrum bands and MVNOs to operate even though they operate over a MNO's RAN.

In FIG. 1, the base stations of the RAN 5 have a number of PLMN identifiers in the list and each PLMN identifier is formed of a Mobile Country Code (MCC) and a Mobile Network Code (MNC) as set out in TS GSM 04.08 incorporated herein by reference. For example, in this embodiment, the base stations are configured to broadcast PLMN identifiers: 23476, 23400 and 23444 relating to different MNOs and MVNOs respectively.

When a mobile device is first switched on, it performs an LTE Initial Access procedure as defined in 3GPP TS 25.331 including cell selection as defined in 3GPP TS 36.304, both documents are incorporated herein by reference.

In summary, the cell selection and reselection procedures involve the mobile device 9 listening for the surrounding base stations, ranking them by signal strength and then repeatedly determining Primary Synchronization Signals (PSS) and Secondary Synchronization Signals (SSS) of the ranked surrounding base stations to synchronize with the base station in the time and frequency domains and also to determine the Physical Cell Identity (PCI) in order to decode the respective MIB and SIB information in order to determine whether the handset is authorized to access the base station.

Since there are often multiple national MNOs, the respective PLMNs will have overlapping ranges and so the mobile device will often be in range of multiple MNOs. The cell selection/reselection involves analyzing the retrieved MIB and SIB information to extract the PLMN list and, determining whether there is a match between, at least one of the PLMNs in the PLMN list broadcast by the base station, and an internally stored list of allowed PLMNs in the UICC of the mobile handset.

If there is no match, the mobile device rejects the current base station and moves to the next detected base station having the next highest signal strength. The process repeats until there is a match between PLMN information whereby the mobile handset performs additional processing in accordance with the overall LTE sequence to be connected to the selected base station.

Once there is a PLMN match between the list received from the connected base station and the data stored in the UICC USIM application, the network name associated with the PLMN is retrieved from an Elementary File (EFs) within the USIM and displayed on the mobile handset to the user.

As mentioned earlier, in a conventional system all base stations for a PLMN are mapped by the USIM to a particular network name so that the heterogeneous RAN formed of macrocells 5a and small cells 5b appear as a homogenous RAN.

Overview of the Processing and Effect of the First Embodiment

In the first embodiment, since there are differences in the capabilities and configuration of the macrocells 5a and small cells 5b, and the available services, the mobile device 9 is configured to differentiate between the types of base station and display different text strings to the user in the network name field. From a user perspective, information about the exact type of connected base station is less important than knowing what services are available and so the network name messages are configured to be service oriented.

In FIG. 1, a mobile handset is shown in different geographic locations and therefore it is shown connected (in idle or active mode) to different types of base station.

In one location, the mobile device 9 is connected to macrocell 5a and since this is the basic LTE service, the mobile handset 9 is configured to display the default network name of "PLMN 4G". In this case the mobile handset will be able to access the LTE network as a metered connection.

Although the macrocells 5a are large area transmitters with greater transmission power and hardware capabilities, in this embodiment, connections to the small cells 5b will allow extra services.

For example, when the mobile device 9 moves to a location where the signal strength to a small cell 5b is greatest, then the mobile device 9 will display "PLMN Unlimited" as the network name to the user. Since the small cell is connected to the cellular network core 3 via an alternative backhaul such as a consumer broadband line, there are no restrictions on the data usage of the mobile device 9 when it is connected via a small cell 5b.

A further case is shown where the mobile device 9 is connected to another small cell having a similar/identical hardware configuration as the other small cell. However, this small cell is located at the mobile device subscriber's home and therefore is linked to the subscriber's account details with the MNO and is connected to the mobile device 9 subscriber's home broadband connection. In this situation, the small cell is defined as the Home eNodeB (HeNB) 5b' by the mobile device 9. Since this HeNB 5b' is linked to their home account, extra services are available to the mobile device such as access to their home network, access to the MNO's premium services, etc. The mobile device 9 will therefore be configured to show a network name of "PLMN Home" to indicate this additional service. In contrast, if another mobile device (not shown) connects to the same small cell 5b' but its HeNB is a different base station, it would display "PLMN unlimited".

In each case, the mobile device 9 is configured to determine the type of base station in the RAN 5 which is providing connectivity and display a user readable indication of the services that may be available via the connection. This processing occurs periodically but also when the phone is in active mode and the network performs a cell handover procedure, and also when the phone is in a non-active state but changing location relative to the currently connected cell and so performs an idle mode reselection procedure.

With the above processing, the user of the mobile device 9 is provided with an indication of the type of connectivity and services that are available at all times. By reading the displayed network name, the user can determine whether they will be charged for certain calls, messages, data services, events and other promotions. For example, on their home cell 5b', the user has more priority for certain types of traffic, or they may be able to access their internal LAN. Macrocell usage is metered according to a user's mobile plan and generic femtocell allows unlimited usage but no other services.

The functionality of the mobile device 9 can also be configured to change according to the type of connected base station. For example, when connected to a macrocell 5a, typically the data allowance is limited according to a service plan and therefore the device can be configured to limit data usage, or hide certain data intensive apps. However, when the mobile device 9 hands over or reselects to a small cell, the data restriction is no longer applicable and therefore those hidden apps are unhidden and the data restrictions are automatically lifted.

As will be described in more detail later, the processing of the USIM application is modified so that multiple network names can be associated with a PLMN identifier and a network name is chosen based on the availability of information broadcast by the different types of base station. In particular, the elementary file $EF_{PNN}$ is modified to allow multiple entries and a new elementary file $EF_{SIM}$ is added to store the possible alternative network names.

The mobile device 9 therefore provides the USIM application with information about base stations in the surrounding area of the mobile handset, and the USIM application selects a valid base station and also instructs the mobile device 9 to display a network name in accordance with the selected base station.

Figure 2:
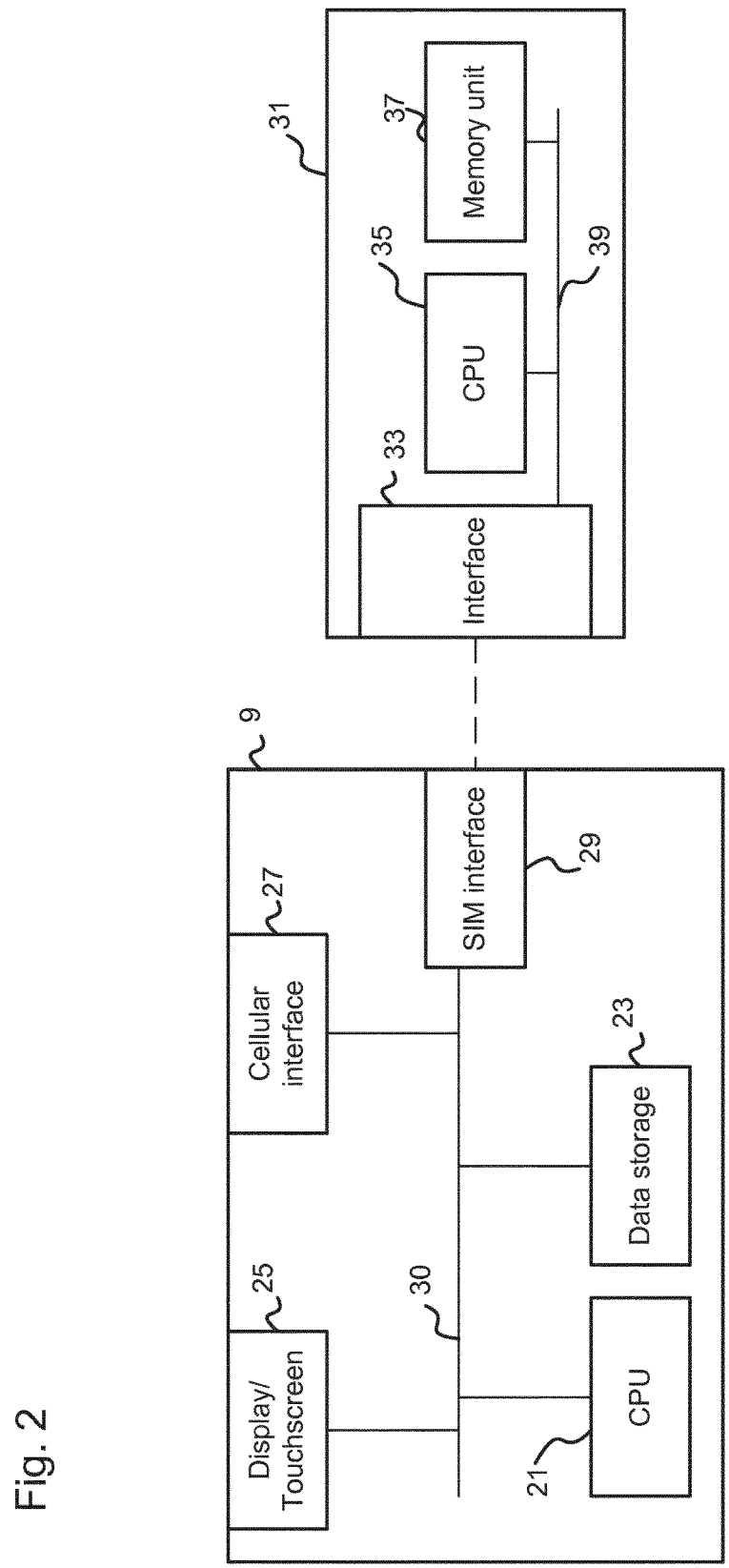
FIG. 2 shows the physical components of the mobile device shown in FIG. 1.

FIG. 2 shows the physical components of a mobile device 9 which are relevant to implementing the first embodiment.

The mobile device 9 includes a Central Processing Unit (CPU) 21, data storage 23 in the form of Random Access Memory (RAM) and Read Only Memory (ROM), a display 25 which includes an integrated touchscreen for user input, a cellular radio interface 27 for communication with base stations and a SIM interface 29. The various components of the mobile device 9 are connected via data bus 30.

The SIM interface 29 is connected to a removable Universal Integrated Circuit Card (UICC) 31 also known as a Subscriber Identity Module (SIM) card which is provided by the MNO to the mobile device subscriber and contains network setting information to allow the mobile device 9 to connect to the PLMN of the MNO. The UICC 31 contains an interface 33 for connecting the UICC 31 to the mobile device 9 via the SIM interface 29, a CPU 35 and a memory unit 37 formed of RAM and ROM, storing MNO configuration data and able to store variable data from the MNO during device operation. The various components are connected via a data bus 39.

The data storage 23 on the mobile device 9 contains processor executable instructions and data structures for governing the function of the mobile device 9. Once loaded and executing on the CPU 21, the components of the mobile device 9 can be regarded as a set of functional unit blocks.

Figure 3:
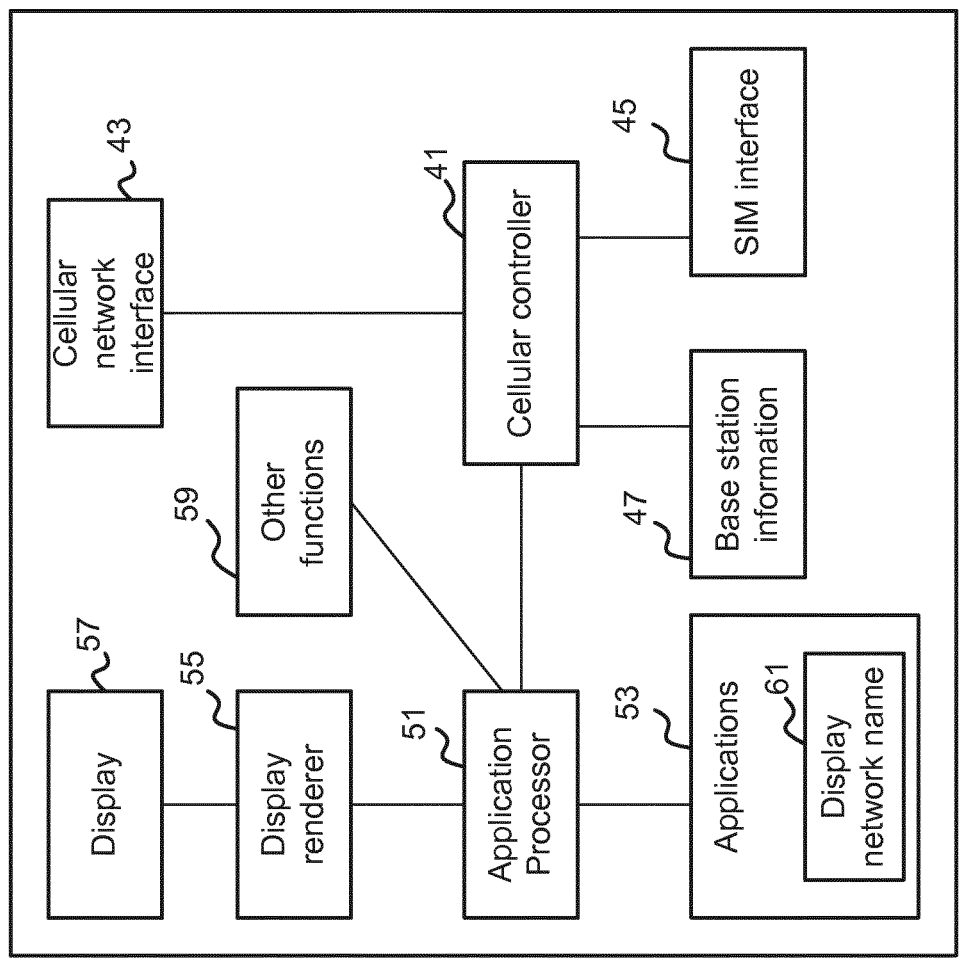
FIG. 3 shows the functional components of the mobile device.

FIG. 3 shows the main functional components of the mobile device 9 in the first embodiment. The mobile device 9 functionality can be divided into two main parts, cellular network connectivity function and application function. The cellular network functionality is concerned with aspects of accessing the cellular network 1 including cell selection, communication and authentication with the PLMN core 3 and USIM application. It is controlled by a cellular network controller 41 which is connected to a cellular network interface 43, a UICC interface 45 and base station information 47.

The application function is responsible for other aspects of the mobile device 9 operation such as running the mobile device 9 operating system and applications, and driving a display. The application function includes an application processor 51, applications 53, a display renderer 55, a display 57 and other functions 59 such as sound control, user input, etc.

In the first embodiment, a display name application 61 is responsible for determining the network name to be displayed on the display 57 of the mobile device 9.

Figure 4:
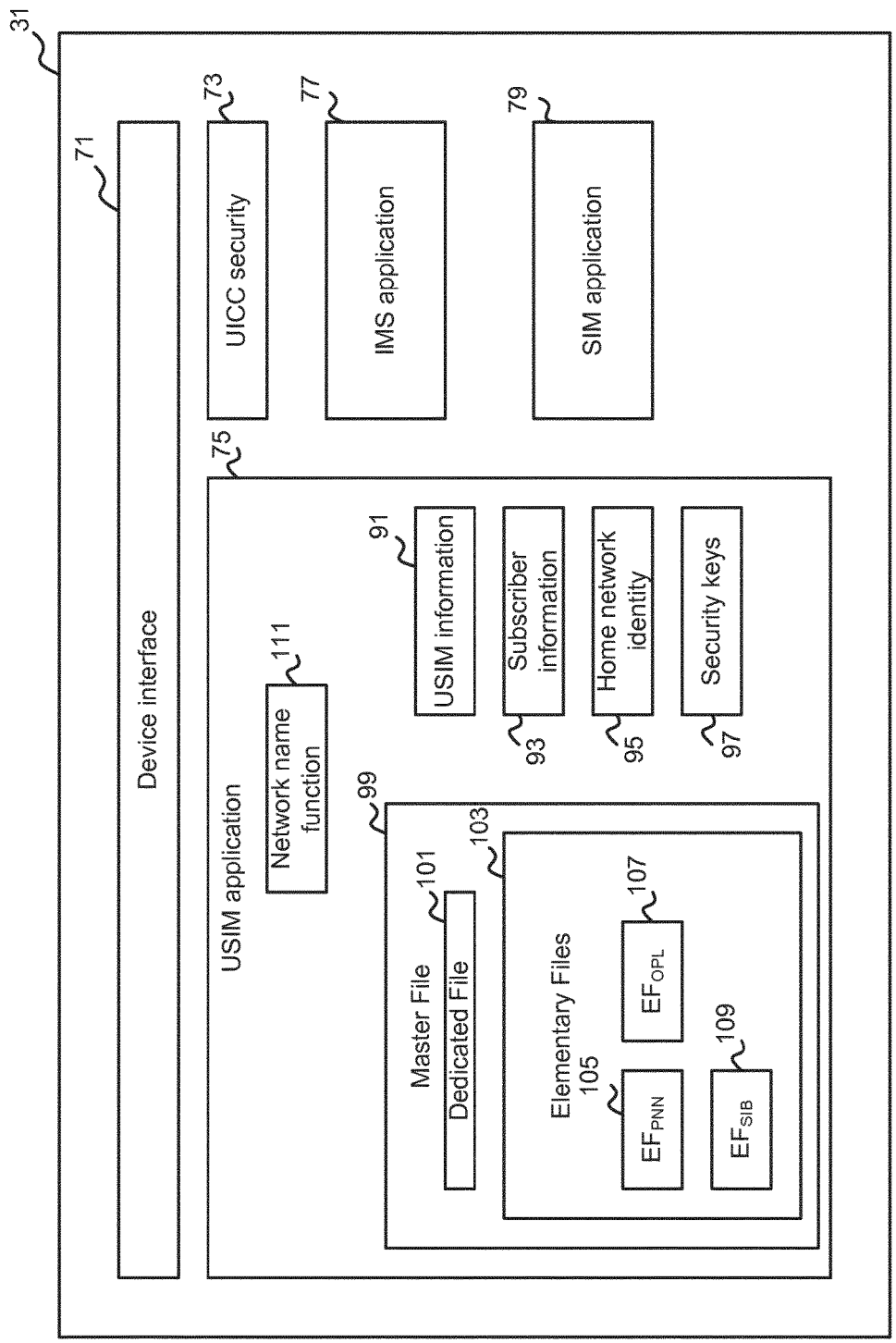
FIG. 4 shows the functional components of a SIM card connected to the mobile device.

FIG. 4 shows the main functional components of the UICC 31 in the first embodiment. The memory unit 37 on the UICC 31 contains processor executable instructions and data structures for governing the function of the UICC 31. Once loaded and executing on the CPU 35, the components of the UICC 31 can be regarded as a set of functional unit blocks.

The functional components of the UICC 31 include a device interface 71 for communication with functional components of the mobile device 9 described earlier.

The UICC 31 also has a UICC security module 73 containing for example, the PIN and PUK lock codes for the UICC 31. A number of applications also operate on the UICC, these include a Universal Subscriber Information Module (USIM) 75 for accessing UMTS and LTE systems, an IP Multimedia Services Information Module application 77 (ISIM) and a Subscriber Information Module (SIM) application 79 for accessing GSM networks.

The USIM application 75 will be described in more detail. Universal Subscriber Identity Module (USIM) is defined in 3GPP TS 31.102 incorporated herein by reference. This application includes USIM information 91, subscriber information 93, a home network identity store 95, security keys 97 and a master file 99 which also contains a dedicated file 101 and a set of Elementary Files (EF) 103 including $EF_{PNN}$ 105 and $EF_{OPL}$ 107.

For ease of reference, the definitions for $EF_{PNN}$ 105 and $EF_{OPL}$ 107 from TS 31.102 are set out below:

4.2.58 EFPNN (PLMN Network Name)
This EF contains the full and short form versions of the network name for the registered PLMN. The ME shall use these versions in place of its own versions of the network name for the PLMN (stored in the ME's memory list), and also in place of the versions of the network name received when registered to the PLMN, as defined by TS 24.008 [9].
This file may also contain PLMN additional information to be displayed to the user during the Manual Network Selection procedures as defined in TS 23.122 [31].
If the EFOPL is not present, then the first record in this EF is used for the default network name when registered in the HPLMN (if the EHPLMN list is not present or is empty) or an EHPLMN (if the EHPLMN list is present).

4.2.59 EFOPL (Operator PLMN List)
This EF contains a prioritized list of Location Area Information (LAI) or Tracking Area Identity (TAI) identities that are used to associate a specific operator name contained in EFPNN or EFPNNI with the LAI/TAI. The ME shall use this EF in association with the EFPNN in place of any network name stored within the ME's internal list and any network name received when registered to the PLMN, as defined by TS 24.008 [9] or TS 24.301 [51]. The PLMN Network Name may also be provided in a graphical format in $EF_{PNNI}$. The ME shall use the text format or the graphical format or both to display the service provider name according to the rules defined in section 4.2.89.

In the first embodiment, the $EF_{PNN}$ 105 is modified to store additional information in the PLMN Additional Information field to indicate whether multiple PNN options are available. Also, a new elementary file, $EF_{SIB}$ 109 is present in the set of EFs 103 to store additional PLMN Network Names as will be described below.

The USIM 75 includes a network name function 111 to perform update to the information stored in the $EF_{SIB}$ 109 using information received from the cellular controller 41 and base station information 47. It is also used by the display network name application 61 of the mobile device 9 to access $EF_{SIB}$ and derive a suitable network name to be displayed on the mobile device 9.

Therefore, in the first embodiment, the processing of the display network name application 61 and the network name function 111 allows different names to be displayed in dependence of the connected base station.

The operation of the network name function 111 to populate the $EF_{SIB}$ 109 will now be described with reference to FIG. 5.

Figure 5:
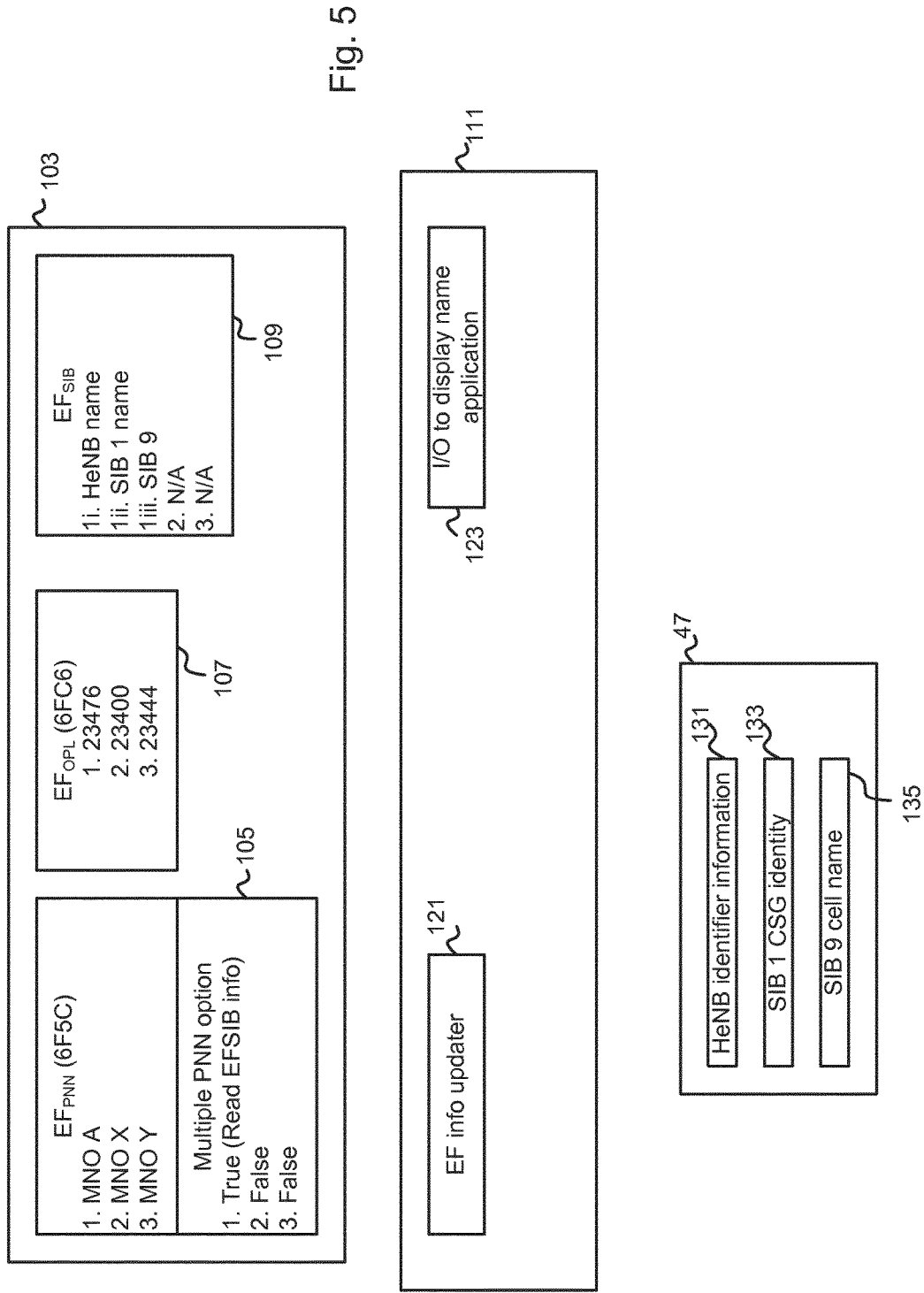
FIG. 5 shows the functional components of a network name applet.

As shown in FIG. 5, the network name function 111 provides an EF information updater 121 and an I/O module 123 for communication with the display name application 61.

In the example, $EF_{OPL}$ 107 is configured by the MNO with the Operator PLMN list:
1. 23476
2. 23400
3. 23444

This indicates that the USIM application 75 will allow connection to three groups of base stations matching those PLMN identifiers.

The $EF_{PNN}$ 105 is configured by the MNO with the following list of PLMN Network Names:
1. MNO A
2. MNO X
3. MNO Y With conventional processing:
when the mobile device 9 connects to a base station having a PLMN identifier of 23476 it would display "MNO A";
when the mobile device 9 connects to a base station having a PLMN identifier of 23400 it would display "MNO X"; and
when the mobile device 9 connects to a base station having a PLMN identifier of 23444 it would display "MNO Y".

However, in the first embodiment, the $EF_{PNN}$ 105 has an additional information field for each listed PLMN:

| PLMN Network Name | Multiple PNN option |
| --- | --- |
| 1. MNO A | True (read EFSIB) |
| 2. MNO X | False |
| 3. MNO Y | False |

The additional information indicates that entry 1 in the $EF_{OPL}$ 107 has the possibility of multiple network names instead of simply "MNO A" to differentiate between macrocells 5a and small cells 5b. However the multiple PNN setting for entries 2 and 3 is set to false so there would be no processing in accordance with the first embodiment for base stations having the entry 2 or entry 3 PLMN identities.

The EF information updater 121 is responsible for populating the $EF_{SIB}$ 109. In particular, it uses information stored in the base station information store 47 within the mobile device 9, retrieved via the cellular controller 41 and SIM interface 45.

The information received from the base station information store 41 will vary depending on the base station type that is connected to the mobile device 9. When a macrocell 5a is connected there will only be basic information, whereas when a small cell is connected there will be more information available such as: HeNB identifier information, a SIB1 CSG identity and/or a SIB 9 cell name.

Examples of information used by the EF information updater 121 to identify a HeNB 5b' includes a Physical Cell Identifier (PCI) extracted during synchronization, a global cell identity from SIB 1, or even the presence of a WiFi SSID which is known to be associated with that mobile device's HeNB.

The EF$_{SIB}$ 109 specifies an ordered priority list for use in determining the network name that should be used. In the example, the highest priority information is an identifier associated with a subscriber's HeNB 5b', the next highest priority is a SIB 1 CSG identity which can be used to identify a specific group of small cells 5b, the second highest priority is a SIB 9 value which can be used to identify any small cell 5b.

The EF information updater 121 has knowledge of the EF$_{SIM}$ 109 list and is configured to examine the base station information in the store 47 and populate EF$_{SIB}$ 109 if there is a match. For example, if the base station information store has both a HeNB identifier information 131, SIB 1 CSG identity 133 and a SIB 9 small cell information 135, then all fields of the EF$_{SIB}$ 109 for that PLMN would be populated. If there is no HeNB identifier information 131 in the base station information in the store 47 but SIB 1 CSG identity information 133 and SIB 9 small cell information 135 is present then the EF information updater 121 would leave the HeNB identifier field empty but populate the SIB1 field and the SIB 9 field in EF$_{SIM}$ 109.

If there is only SIB 9 information available, then only the SIB 9 entry in EF$_{SIM}$ 109 is filled.

Finally, if the mobile device 9 is connected to a macrocell, then no data is stored in EF$_{SIB}$ 109.

Each time the mobile device 9 connects to a different base station, the information stored in EF$_{SIB}$ 109 is flushed and new information about the newly connected base station is supplied by the base station information 47 and processed by the network name function 111 so that new naming options are available and current.

Once the EF$_{SIB}$ 109 information has been updated, the display network name application 61 is configured to communicate with the USIM 75 I/O 123 and read the EF information in EF$_{SIB}$ 109 to determine a network name to display on the mobile device 9.

Figure 6:
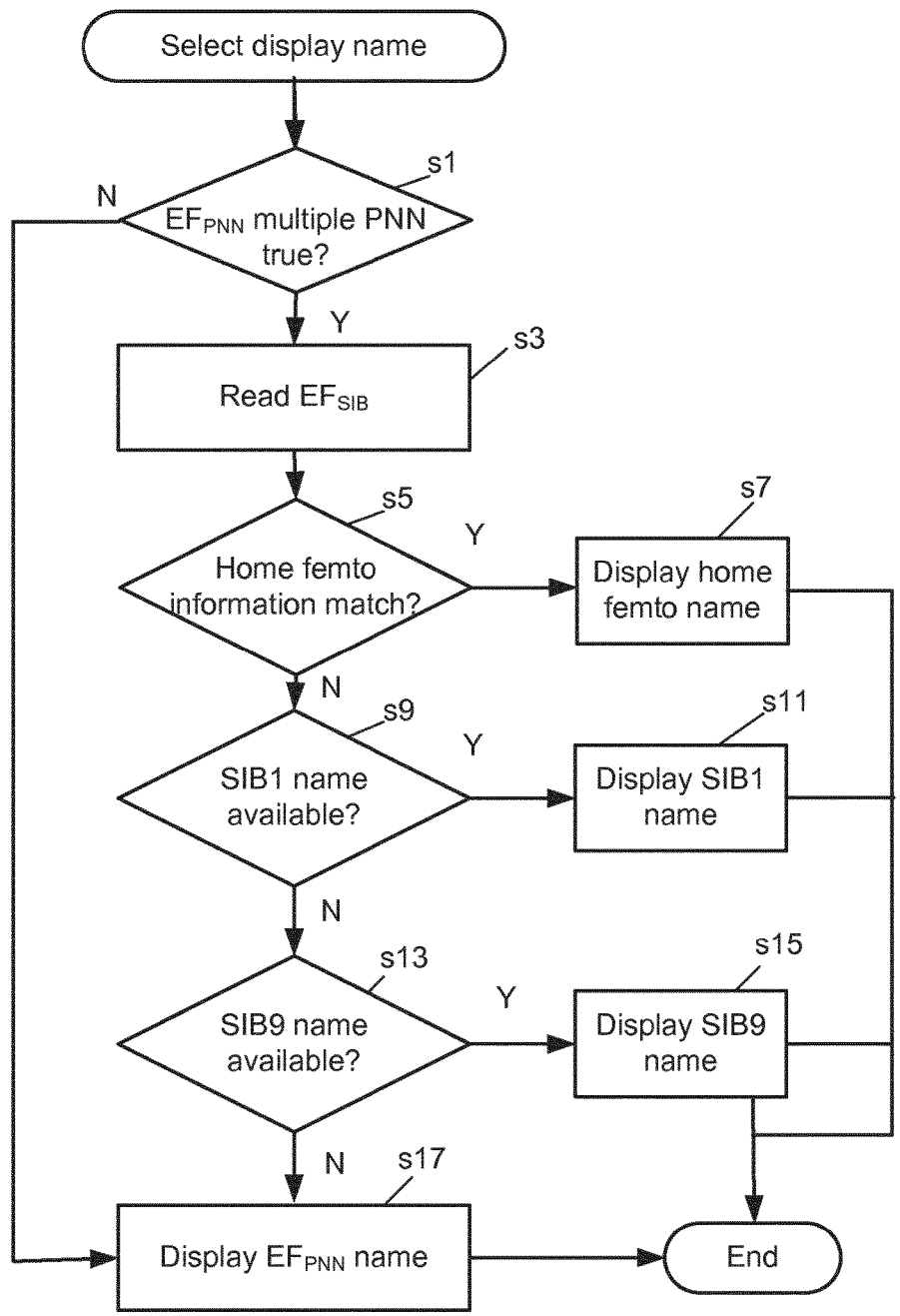
FIG. 6 is a flowchart showing the operation of the mobile device.

FIG. 6 is a flowchart showing the operation of the display network name application 61.

Having extracted the base station's PLMN identity as an index to the EF$_{OPL}$ 107, in s1, as part of checking the corresponding entry in the EF$_{PNN}$ 105, a test is performed to see whether the additional information specifies that multiple PNN may be available. If the entry is false, then the corresponding default EF$_{PNN}$ 105 name is used as the network name because, for that network, there is no distinction between macrocells and small cells.

However, if the multiple PNN option is true, then in s3 the EF$_{SIB}$ 109 information is read so that one of the possible multiple PNN network names is selected and processing ends.

At s5, a test for the presence of information in the highest priority option field, that relating to the home small cell 5b' is performed. If the test determines that the home cell is connected, then in s7 the home cell name is extracted and the display render 55 renders the network name to be displayed on the display 57.

If the test in s5 fails, then the EF$_{SIB}$ 109 information is checked in s9 for a SIB 1 entry which is the highest priority entry. If the SIB 1 information is available, then the retrieved information is displayed and processing in FIG. 6 ends.

However if the test in s9 fails, then the next priority entry is checked in s13, in this case the SIB9 information. If an entry is available, then in s15 the SIB 9 name is displayed and processing ends.

If the test in s13 fails then it is determined that the mobile device 9 is connected to a macrocell and so the default network name is displayed and processing ends.

The determined network name is displayed until the mobile device 9 connects to a different base station in an active mode handover, idle mode reselection or initial cell selection routine.

With the above processing, the network name is varied according to the type of connected base station of the RAN 5 so that the subscriber is aware of different services may be available.

Furthermore, other applications of the mobile device 9 are configured to react to the display network name application 61 in order to alter the functioning of the mobile device 9. For example, when connected to a macrocell 5a, typically the data allowance is limited according to a service plan and therefore a further application of the device is configured to cause the phone to limit background data for other applications, or hide certain data intensive applications. However, when the mobile device 9 connects to a small cell, the data restriction is no longer applicable and therefore those hidden apps are unhidden and the data restrictions are automatically lifted.

Alternatives and Modifications

In the embodiment, the information received from the base station is extracted and used in an unmodified form as the displayed network name. In an alternative, the network name function 111 the USIM 75 contains extra processing to alter or append the retrieved base station information so that a more meaningful network name can be presented, for example, appending "home" or "small cell" where appropriate.

In a first modification, the EF information updater 121 changes the actual HeNB, SIB 1 or SIB 9 specific information into a network name prior to storage in EF$_{SIB}$ 109. In a further modification, EF information updater 121 stores the actual values of the received HeNB, SIB 1 or SIB 9 information in EF$_{SIB}$ 109 but the I/O 123 is arranged to return the abstracted network name to the mobile device 9.

To provide even more flexibility and meaningful names, the network name can be based on a lookup table of key phrases. In a further alternative the network name function 111 has a look-up table. The translations to be used are updated over-the-air by the NMO or could be pre-defined when the UICCs are created.

Example Look Up Table

| Key phrase | Display text |
| --- | --- |
| Any information which identifies the home femto cell | "MNO home femto unlimited data" |
| "MNO 4 G" + "Public" | "MNO hotspot unlimited data" |
| "MNO 4 G" + "Office" | "MNO Office service" |
| "MNO 4 G" | "MNO femto unlimited data" |
| None | "MNO standard tariff" |

In terms of the services:

MNO home means the subscriber has access to home service e.g. LIPA, free television of movie service) and have unlimited data allowance.

MNO unlimited means that there are no home services, but still have unlimited data allowance MNO 4G display means no home service and are on a standard metered data allowance.

In the embodiment, the USIM 75 has an I/O function 123 to enable the mobile device 9 to extract the network name from information held in EF$_{SIB}$. In an alternative, the USIM 75 contains a Java Card applet for determining a network name to be displayed and sending that information to the mobile device.

The invention claimed is:

1. A method of operating a mobile device, the method comprising:
scanning for a set of base stations from a plurality of base stations, each base station being part of a cellular network;
connecting to a base station from the set of base stations;
displaying a network name associated with a cellular network identifier of the connected base station; and
accessing a data store accessible to the mobile device, the data store storing an ordered set of base station property fields relating to candidate network names associated with different types of base stations having the same cellular network identifier; and
identifying a highest priority entry in the ordered set for the connected base station,
wherein the displayed network name corresponds to the identified highest priority entry candidate network name.

2. The method according to claim 1, further comprising modifying a set of cellular network services available to the mobile device in accordance with the displayed network name.

3. The method according to claim 1, wherein the mobile device is configured to determine when the mobile device is connected to a cellular network macrocell base station and a small cell base station.

4. The method according to claim 3, wherein the mobile device is further configured to determine when the mobile device is connected to a home cell of an operator of the mobile device.

5. The method according to claim 1, further comprising:
extracting base station identifier information broadcast by the connected base station;
processing the extracted base station identifier information to identify a presence of data relating to the base station property fields; and
storing the identified data into the ordered set within the data store, the data store being located within a universal subscriber identity module of the mobile device.

6. The method according to claim 1, further comprising translating the base station property fields into network names for display and including an indication of cellular network services available to an operator of the mobile device.

7. The method according to claim 1, further comprising determining whether a plurality of candidate network names are associated with the cellular network identifier of the connected base station.

8. A mobile device apparatus comprising:
a cellular network interface to:
scan for a set of base stations from a plurality of base stations, each base station being part of a cellular network, and
connect to a base station from the set of base stations;
a display to display a network name associated with a cellular network identifier associated with the connected base station;
a data store storing an ordered set of candidate network names associated with different types of base stations having the same cellular network identifier; and
a processor to identify a highest priority entry in the ordered set for the connected base station,
wherein the displayed network name corresponds to the identified highest priority entry candidate network name.

9. The apparatus according to claim 8, wherein the processor is configured to modify a set of cellular network services available to the mobile device apparatus in accordance with the displayed network name.

10. The apparatus according to claim 8, wherein the cellular network interface is configured to determine when the mobile device apparatus is connected to a cellular network macrocell base station and a small cell base station.

11. The apparatus according to claim 10, wherein the mobile device apparatus is further configured to determine when the mobile device apparatus is connected to a home cell of an operator of the mobile device apparatus.

12. The apparatus according to claim 8, wherein the processor is configured to:
extract base station identifier information broadcast by the connected base station;
process the extracted base station identifier information to identify a presence of data relating to base station property fields; and
cause the identified data to be stored into the ordered set within the data store,
wherein the data store is located within a universal subscriber identity module of the mobile device apparatus.

13. The apparatus according to claim 8, further comprising a look up table in the data store for translating base station property field information into network names including an indication of cellular network services available to an operator of the mobile device apparatus.

14. The apparatus according to claim 8, wherein the processor is configured to determine whether a plurality of candidate network names are associated with the cellular network identifier of the connected base station.

15. A non-transitory computer-readable storage medium storing a computer program product comprising processor executable instructions for causing a programmable processor executing the instructions to perform the method as claimed in claim 1.

* * * * *